(12) United States Patent
Kimura (10) Patent No.: US 6,427,780 B1
(45) Date of Patent: *Aug. 6, 2002

(54) COMMUNICATION SYSTEM FOR SURVEYING INSTRUMENT

(75) Inventor: Kazuaki Kimura, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/192,946

(22) Filed: Nov. 16, 1998

(30) Foreign Application Priority Data

Nov. 14, 1997 (JP) .............................................. 9-313215

(51) Int. Cl.7 .......................... A01B 79/00; G01B 11/14
(52) U.S. Cl. ............................................. 172/2; 701/50
(58) Field of Search ...................... 38/348, 907; 172/4, 172/4.5, 2; 701/50; 235/454, 467; 356/4.08, 5.08, 138, 139.06, 141.1, 141.4, 152.1; 359/833, 834

(56) References Cited

U.S. PATENT DOCUMENTS

| | | | |
|---|---|---|---|
| 4,681,433 A | | 7/1987 | Aeschlimann .................. 356/5 |
| 4,732,471 A | * | 3/1988 | Cain et al. .................... 356/152 |
| 4,830,489 A | | 5/1989 | Cain et al. ..................... 356/73 |
| 5,572,809 A | * | 11/1996 | Steenwyk et al. ............. 37/348 |
| 6,014,220 A | | 1/2000 | Kimura ........................ 356/400 |
| 6,016,455 A | * | 1/2000 | Ohtomo et al. ................ 701/50 |
| 6,023,326 A | * | 2/2000 | Katayama et al. ....... 356/141.3 |

FOREIGN PATENT DOCUMENTS

| | | | |
|---|---|---|---|
| EP | 0797076 A2 | 9/1997 | ........... G01C/15/00 |
| EP | 0811727 A1 | 12/1997 | ............. E02F/3/84 |
| JP | 05322569 | 12/1993 | ........... G01C/15/00 |

OTHER PUBLICATIONS

Aschwanden, Peter, "Vermessungssystem mit hoher Genauigkeit," *TR Technische Rundschau Transfer* 1995;40:20–22.

* cited by examiner

*Primary Examiner*—Robert E. Pezzuto
(74) *Attorney, Agent, or Firm*—Chapman and Cutler (57) ABSTRACT

A communication system for a surveying instrument according to the present invention comprises: a tracking target for reflecting tracking light therefrom; a survey unit for emitting the tracking light toward the tracking target and receiving a tracking light reflected from the tracking target using a light receiving device to thereby automatically track the tracking target; a modulator for modulating the tracking light in order to transmit information concerning a surveying work toward the tracking target; a light receiving element provided on the tracking target to receive the tracking light; and a demodulator for demodulating the tracking light received by the light receiving element. The transmission of information concerning the surveying work is carried out through optical communication using the tracking light, and the influence caused by electric wave noises, radio interference and the like can be avoided.

14 Claims, 9 Drawing Sheets

COMMUNICATION SYSTEM FOR SURVEYING INSTRUMENT

BACKGROUND OF THE INVENTION

1. Field of the Invention

The present invention relates to a communication system for an automatic tracking type survey unit.

2. Description of the Related Art

There has been known a surveying instrument for automatically tracking a tracking target by measuring a distance to the tracking target, an angle (hereinafter referred to as "horizontal angle") formed by a direction in which a tracking target is present with respect to a reference direction, and an angle (hereinafter referred to as "elevation angle") formed by a direction in which a tracking target is present with respect to a reference height.

Figure 13:
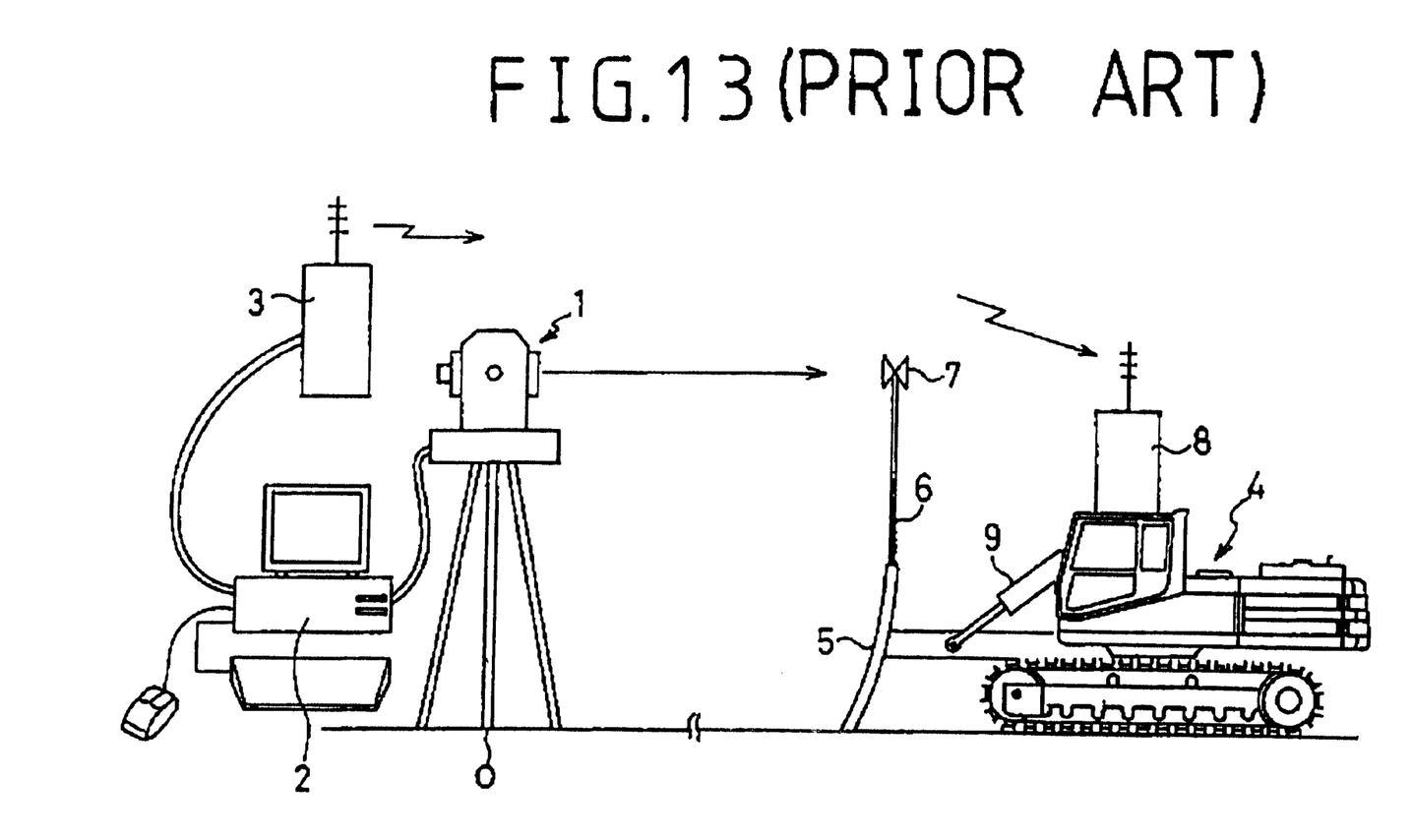
FIG. 13 is an explanatory view of a conventional communication system for a surveying instrument applied to the construction work.

FIG. 13 shows a conventional communication system for a surveying instrument for automatically controlling a construction machine using an automatic tracking type survey unit. In this figure, reference numeral 1 designates an automatic tracking type survey unit. The automatic tracking type survey unit I is installed at a known point O set as a reference position in a working site. A personal computer 2 is connected to the automatic tracking type survey unit 1, and a radio transmitter 3 is connected to the personal computer 2.

A bulldozer 4 as a construction machine is provided with a blade 5 as a ground leveling implement. A pole 6 is stood up on the blade 5, and a prism 7 used as a tracking target is provided on the pole 6. The bulldozer 4 is provided with a radio receiver 8 for receiving an electric wave transmitted from the radio transmitter 3.

Finished height data (described later) at respective horizontal coordinate positions in the working site is stored in the personal computer 2. The automatic tracking type survey unit 1 tracks the prism 7 to measure the distance from the known point O to the prism 7, and the horizontal angle from the reference direction to the direction in which the prism 7 is present for determining a horizontal coordinate position of the prism 7 with the known point O as a reference. The data of the horizontal coordinate position is transmitted from the automatic tracking type survey unit 1 to the personal computer 2.

The personal computer 2 reads out the finished height data of ground at the determined horizontal coordinate position to send the data to the radio transmitter 3. The radio transmitter 3 transmits the finished height data, as information relating to the surveying work, to the radio receiver 8, and the bulldozer 4 controls the blade 5 by a hydraulic controller 9 on the basis of the finished height data received by the radio receiver 8. The blade 5 excavates or cuts the ground to form a finished plane of the designed finished height (i.e., construction height).

However, according to the conventional communication system between the surveying instrument side and the construction working machinery side, in the working site, generally, operators use transceivers to keep in contact with each other, and electric wave noises generated by the construction machine are present. Therefore, radio interference or communication trouble tends to occur in communication between the surveying instrument side and the construction machine side. Due to this fact, information relating to the surveying work transmitted by the surveying instrument is sometimes not transmitted accurately to the tracking target on the construction machine side.

SUMMARY OF THE INVENTION

It is an object of this invention to provide a communication system for a surveying instrument which is hard to generate radio interference or communication trouble even under the presence of electric wave noises and the like.

For achieving the aforementioned object, according to a first aspect of the present invention, there is provided a communication system for a surveying instrument in which a survey unit irradiates tracking light toward a tracking target, the tracking light is then reflected by the tracking target, the tracking light reflected from the tracking target is then received by light receiving means in the survey unit to thereby automatically track the tracking target, modulation means modulates the tracking light to transmit information relating to a surveying work toward the tracking target, a light receiving element provided on the tracking target then receives the tracking light, and demodulation means demodulates the tracking light received by the light receiving element.

Thus, there is exhibited an effect that the survey unit communicates with the tracking target through optical communication using the modulated tracking light, and information relating to the surveying work can be transmitted while avoiding radio interference or communication trouble even under the presence of electric wave noises or the like. In particular, since the survey unit automatically tracks the tracking target, the directivity of the tracking light with respect to the tracking target is enhanced, and the efficient transmission of information is accomplished by using the tracking light also for communication.

According to, a second aspect of the present invention, there is provided a communication system for a surveying instrument in which the tracking target is horizontally rotatable together with the light receiving element and is automatically directed at the survey unit on the basis of a light receiving output of the light receiving element.

Thus, there is exhibited an effect that even if a change occurs in a relative positional relationship between the survey unit and the tracking target, the survey unit can keep tracking the tracking target.

According to a third aspect of the present invention, there is provided a communication system for a surveying instrument in which the survey unit is installed at a known point to designate respective points of a working site as coordinates with the known point defined as a reference, a tracking target is provided on a leveling implement of a construction machine, the construction machine has ground leveling implement control means for controlling a ground leveling implement, the working site is leveled by the ground leveling implement to form a finished plane, finished height data memory means on the survey unit side stores heights from the known point at respective horizontal coordinate positions of the finished plane as finished height data, horizontal coordinate position determination means determines a horizontal coordinate position of the tracking target, arithmetic means calculates a deviation from a target height of the tracking target at the horizontal coordinate position on the basis of the finished height data relative to the determined horizontal coordinate position, the deviation is transmitted as information relating to the surveying work toward the tracking target, and the ground leveling implement control means adjusts a height position of the ground leveling implement so that the tracking target is made closer to the target height on the basis of the result of reception of the tracking target whereby a ground at the determined horizontal coordinate position is leveled into the finished plane.

Thus, there is exhibited an effect that automated and efficient construction work can be accomplished.

According to a fourth aspect of the present invention, there is provided a communication system for a surveying instrument in which the survey unit irradiates tracking light toward a tracking target, the tracking target then reflects the tracking light, light receiving means in the survey unit receives the tracking light reflected from the tracking target to thereby automatically track the tracking target, and light receiving means provided on the tracking target sends modulated light including information relating to a surveying work toward the survey unit.

Thus, there is exhibited an effect similar to that of the first aspect in that the survey unit communicates with the tracking target through optical communication using modulated light from the light receiving means.

BRIEF DESCRIPTION OF THE DRAWINGS

The above and other objects, features and advantages of the present invention will become apparent from the following description taken in connection with the accompanying drawings, in which.

DESCRIPTION OF THE PREFERRED EMBODIMENTS

Figure 1:
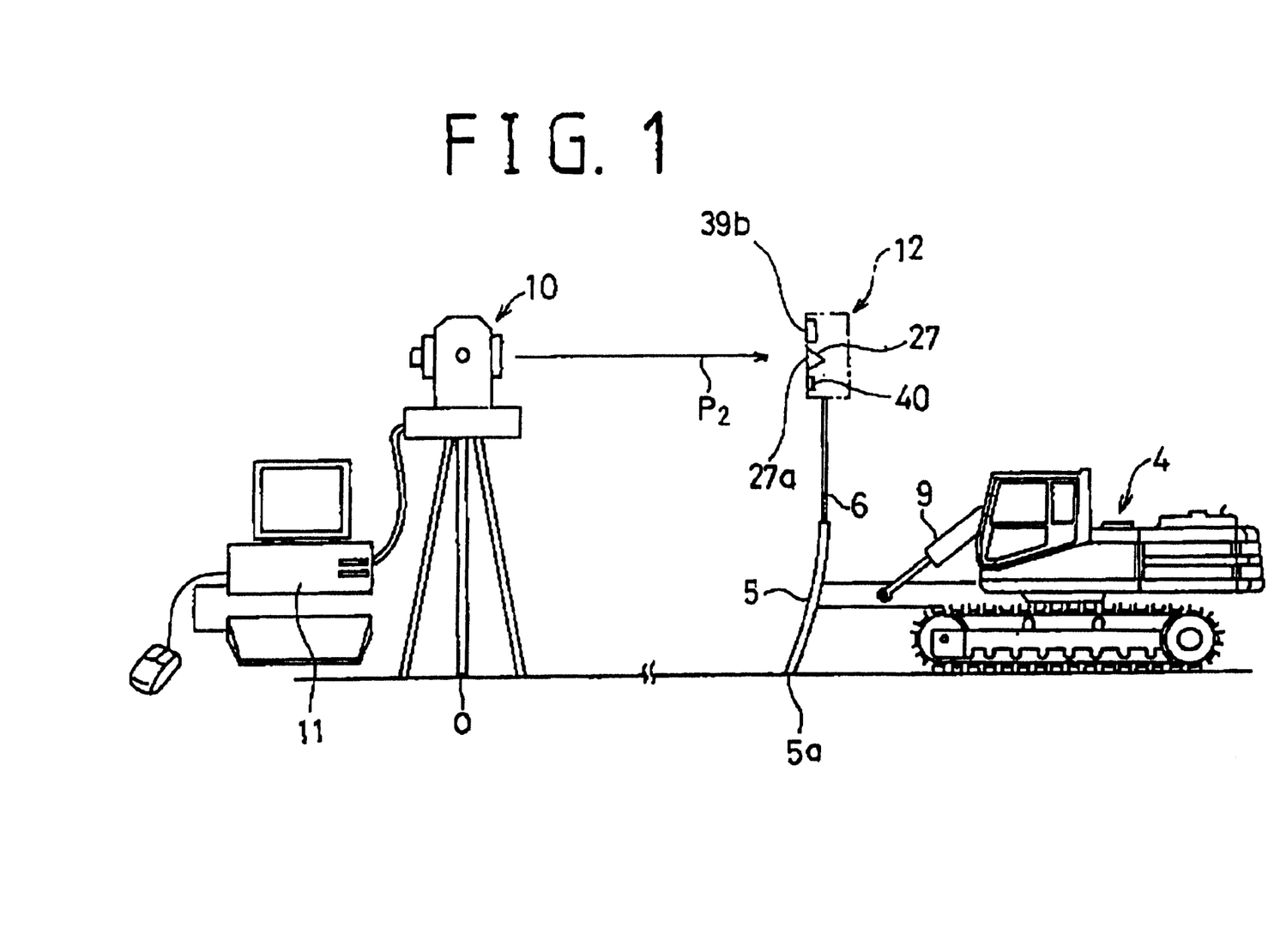
FIG. 1 is an explanatory view of a communication system for a surveying instrument according to the present invention and applied to a construction work.

FIG. 1 shows one embodiment of a communication system for a surveying instrument according to the present invention. In FIG. 1, reference numeral 10 designates an automatic tracking type survey unit; 11 designates a personal computer connected to the automatic tracking type survey unit 10; 4 designates a bulldozer as a construction machine for leveling a working site; and 5 designates a blade as a ground leveling implement. The blade 5 is controlled by a hydraulic controller 9 as ground leveling implement control means, the blade 5 being provided with a tracking unit 12 as a tracking target.

Figure 2:
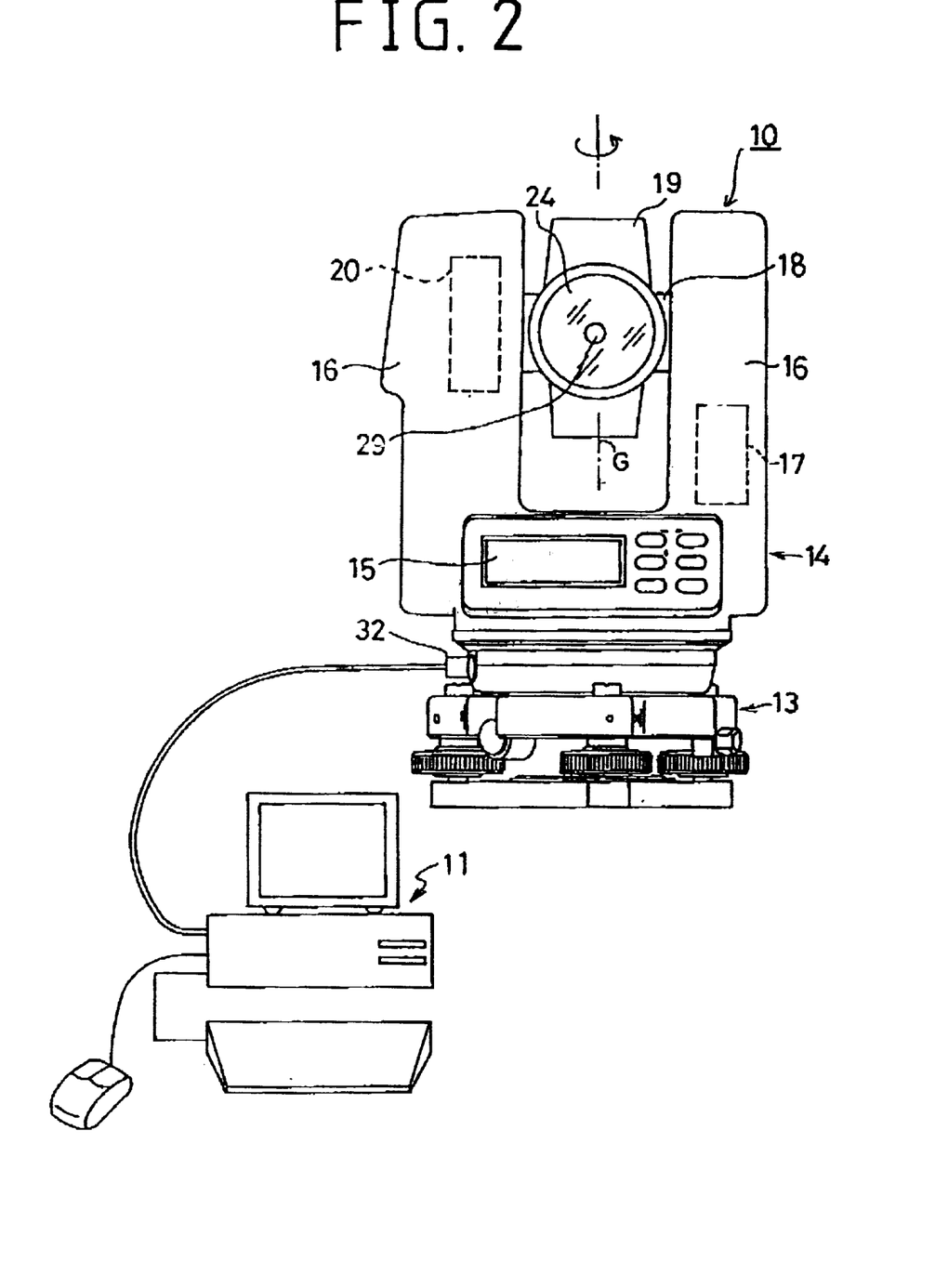
FIG. 2 is a schematic view of an automatic tracking type survey unit.

The surveying machine 10 comprises a base board portion 13 and an apparatus body portion 14, as shown in FIG. 2. The apparatus body portion 14 has a display portion 16 and a mount 16, and can be rotated within a horizontal plane about a vertical axis G by a horizontal rotational means 17. A horizontal shaft 18 is provided on the mount 16, and a lens barrel portion 19 is held on the horizontal shaft 18. The lens barrel portion 19 can be rotated within the vertical plane about the horizontal shaft 18 by a vertical rotational means 20. The rotational amount within the horizontal plane of the apparatus body portion 14 and the rotational amount within the vertical plane of the lens barrel portion 19 are detected by an angle reading device (a rotary encoder) not shown.

Figure 3:
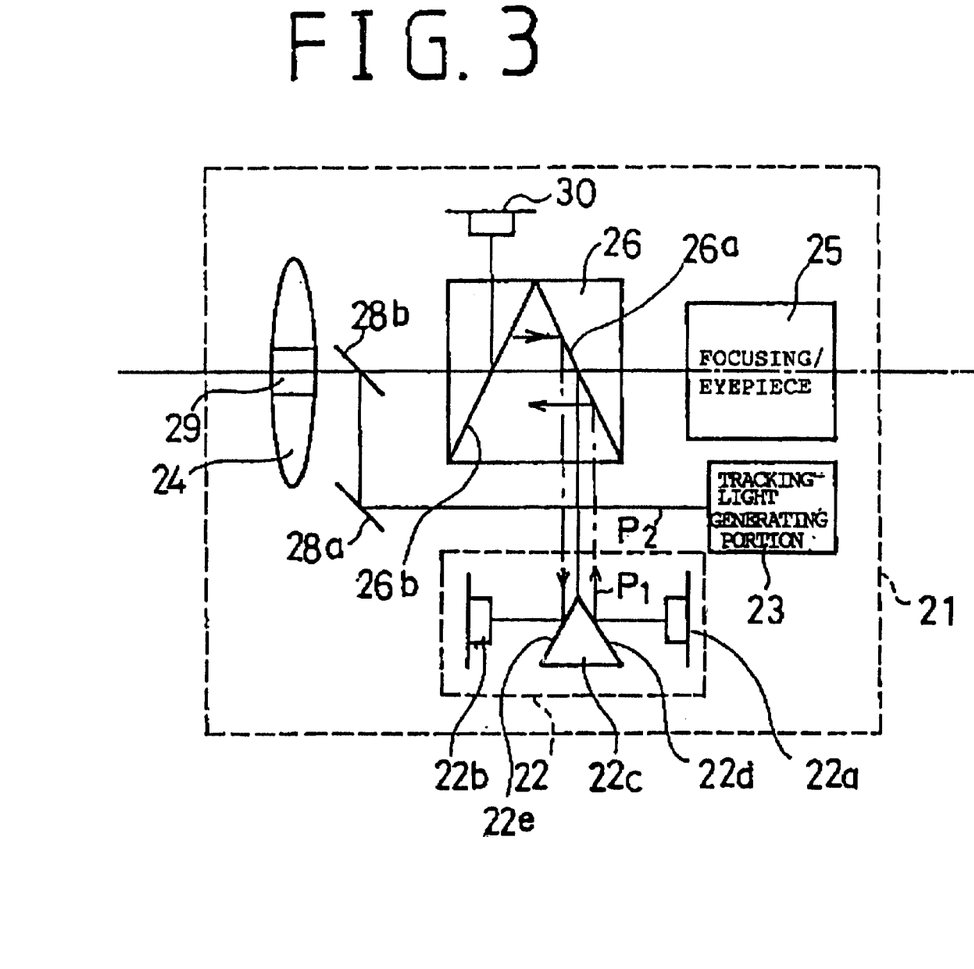
FIG. 3 is an optical view showing a schematic constitution of the interior of a lens barrel portion.

The lens barrel portion 19 is provided with a measuring and tracking unit portion 21 shown in FIG. 3. The measuring and tracking unit portion 21 has an electric distance measurement (hereinafter referred to as EDM portion) 22 for measuring the distance to the tracking unit 12, a horizontal tracking-light generating portion 23 (laser beam), and an objective lens 24 used in common for measurement and tracking. The objective lens 24 is provided in its center portion with a center hole 29 and is combined with an eyepiece 25 to constitute a telescope. A focal point is adjusted by the eyepiece 2S whereby an operator can see the tracking unit 12 through the telescope.

The EDM portion 22 mainly comprises a light emitting element 22a, a light receiving element 22b, and a split mirror 22c. Measuring light P1 modulated at a specific frequency is emitted from the light emitting element 22a for measuring the distance to a prism 27 (see FIG. 1) of the tracking unit 12. The measuring light P1 is reflected by a reflecting surface 22d of the split mirror 22c and a reflecting surface 26a of a dichroic mirror 26, then passes through a lower half portion of the objective lens 24 and is guided to the prism 27. The measuring light P1 reflected by the prism 27 is condensed by an upper half portion of the objective lens 24, then passes through the reflecting surface 26b of the dichroic mirror 26, is then reflected by the reflecting surface 26a and is guided to the light receiving element 22b by the reflecting surface 22e of the split mirror 22c. The EDM portion 22 is provided with a processing circuit, not shown, for operating a phase difference between a light emitting signal and a light receiving signal to obtain the distance to the prism 27 from the phase difference.

Figure 4:
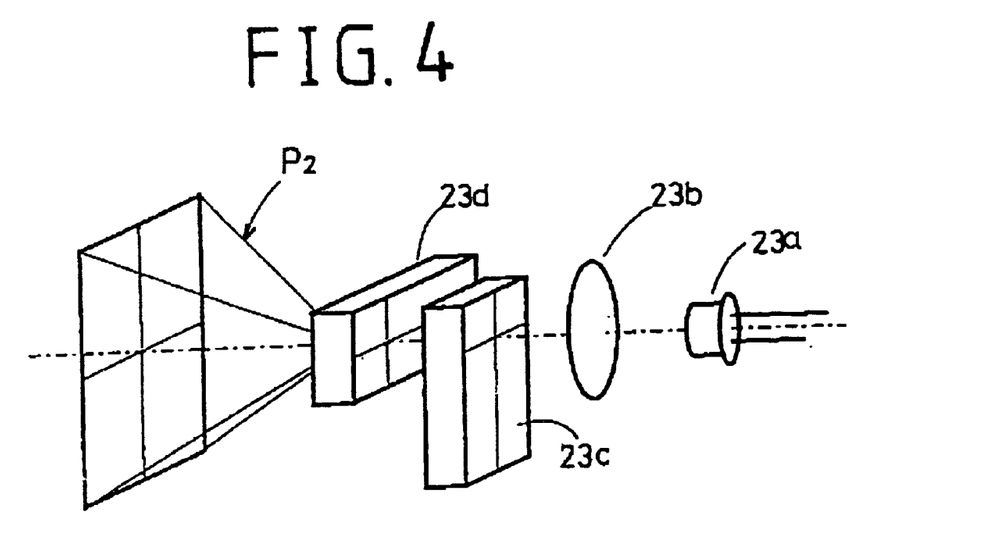
FIG. 4 is an explanatory view showing a schematic constitution of a tracking portion.

The generating portion 23 has a two-dimensional scanning portion for scanning tracking light P2 in the two-dimensional direction of X-Z. The wavelength of the tracking light 2 is different from that of the measuring light P1, and the two-dimensional scanning portion is constructed of a laser diode 23a for emitting the tracking light (laser beam) P2, a collimation lens 23b for converting the tracking light P2 into parallel rays of light, and acoustic optical elements 23c, 23d disposed to be crossed to each other, as shown in FIG. 4. The detailed constitution of the tracking portion is known, description of which is omitted. However, for example, see FIG. 3 of Japanese Patent Application Laid-Open No. 5-322569, if necessary. Note that the tracking light may be scanned by a combination of a rotary polygonal mirror and a galvanomirror.

According to the scanning of the laser beam as described, the tracking can be made even if the tracking unit 12 is located far away from the automatic tracking type survey unit 10 because a divergent angle of the laser beam itself is narrow, and energy density of the tracking light P2 is high.

The tracking light P2 emitted from the two-dimensional scanning portion is reflected by mirrors 28a and 28b, and is directed at the prism 27 passing through the center hole 29 of the objective lens 24. The tracking reflected light P2 reflected by the prism 27 is condensed by the whole surface of the objective lens 24, is then reflected by the reflecting surface 26b of the dichroic mirror 26 and is condensed by a light receiving element 30 as light receiving means.

Figure 5:
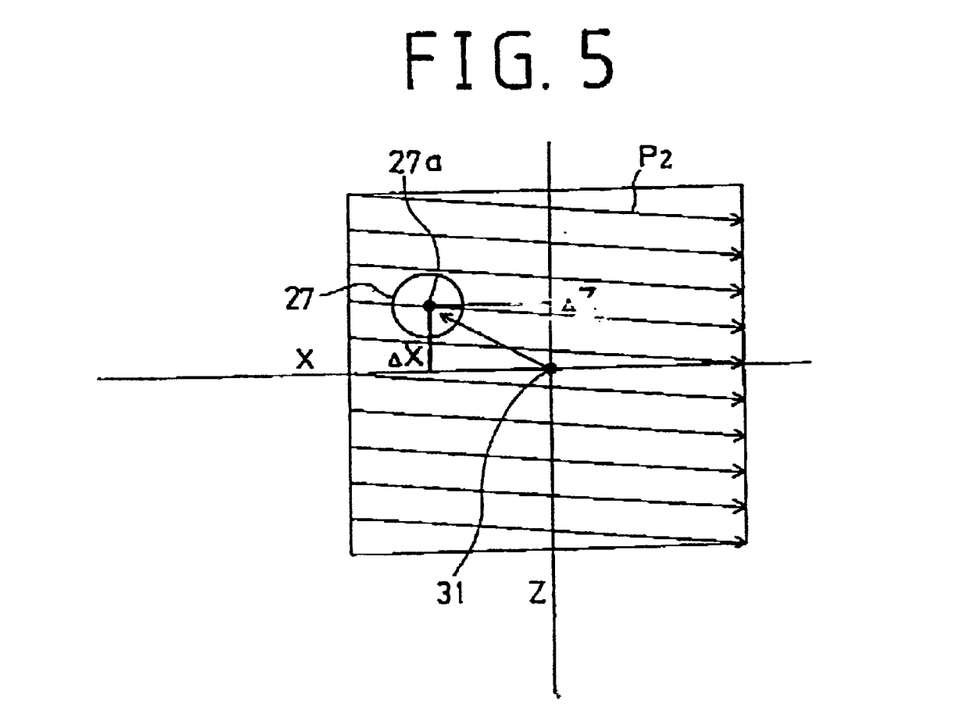
FIG. 5 is an explanatory view showing one example of the scanning by tracking light.

In the measuring and tracking unit portion 21, the tracking light P2 is subjected to raster scanning in the direction of X-Z as shown in FIG. 5 to detect the position of the prism 27. In the raster scanning, 10 msec is necessary to complete the whole scanning if the horizontal scanning time of one line is 0.1 msec, and vertical scanning consists of 100 scanning lines, for example. In the processing circuit, not shown, connected to the light receiving element 30 provided on the automatic tracking type survey unit 10, scanning timing at which the tracking light P2 impinges upon the prism 27 is detected by the reception of light by the light receiving element 30 to measure deviations ΔX and ΔZ in the directions X and Z of the center position 27a of the prism 27 with respect to the scanning center 31. The measured deviations ΔX and ΔZ are converted into the rotational amount within the horizontal plane of the apparatus body portion 14 and the rotational amount within the vertical plane of the lens barrel portion 19, respectively, and the converted results are fed back to the respective rotational mechanisms 17 and 20. By the operation of the rotational mechanisms 17 and 20, the automatic tracking type survey unit 10 automatically collimates the center of the prism 27.

The automatic tracking type survey unit 10 houses a built-in CPU, not shown, which functions as a part of the processing circuit. The CPU determines a horizontal coordinate position and a height coordinate position of the prism 27, that is, the tracking unit 12 on the basis of a distance to the prism 21, a horizontal angle and an elevation angle obtained by measurement. The determined horizontal coordinate position is displayed on the display portion 15 and is output to an input/output port 82. The input/output port 32 is usually composed of a RS/232C (EIA) and is connected to the personal computer 11.

Figure 12:
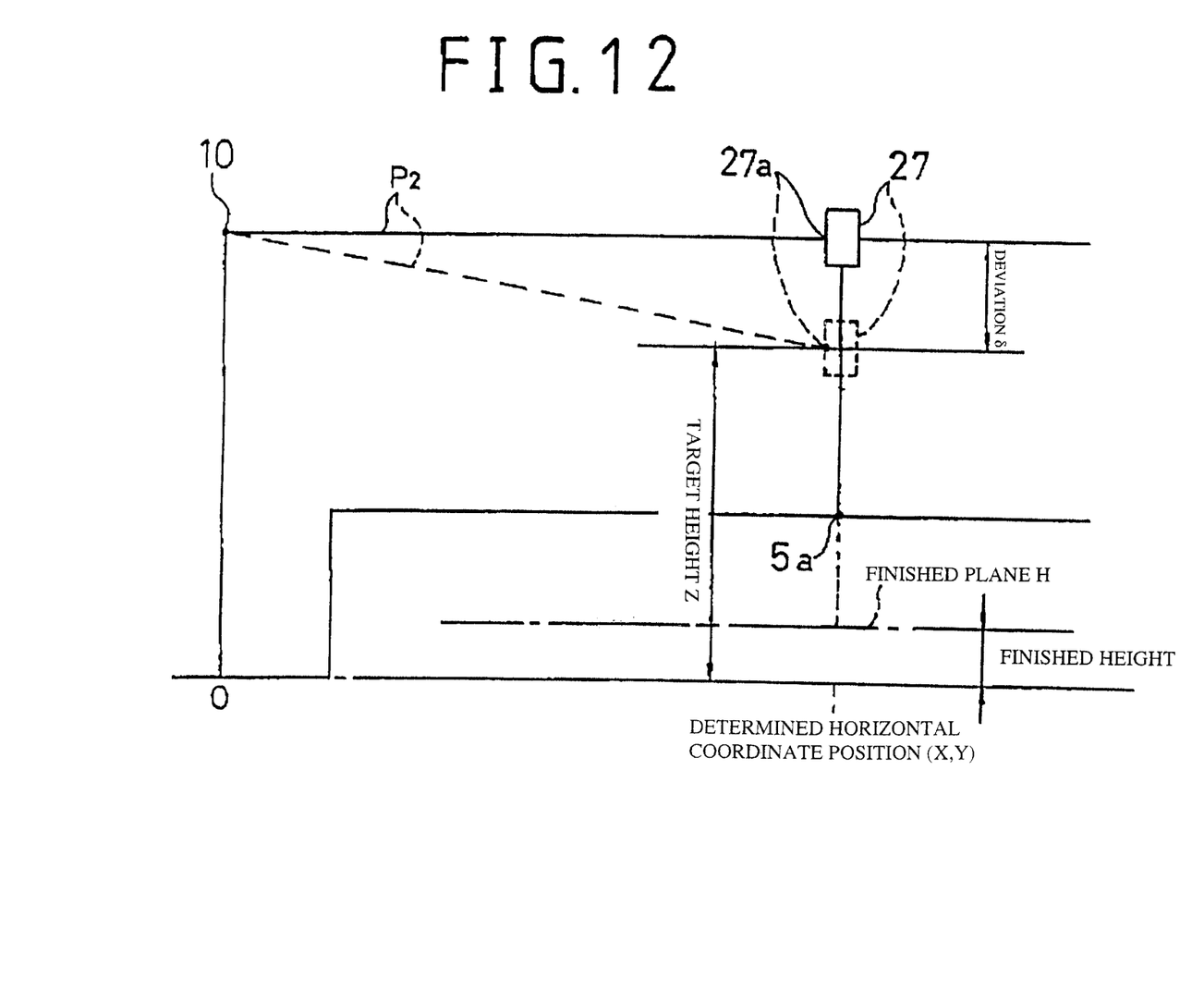
FIG. 12 is an explanatory view showing the concept of a fished surface, a finished plane height, and a deviation.

The personal computer 11 stores therein 3-dimensional design data of a working site and delivers and receives data between the CPU and the computer 11. The 3-dimensional design data of the working site herein termed is finished height data at each horizontal coordinate position of the working site, and the finished height data herein termed is data relating to a height of an expected finished plane H with respect to the known point O (see FIG. 12). The personal computer 11 outputs finished height data relating to the horizontal coordinate position input from the automatic tracking type survey unit 10, and the automatic tracking type survey unit 10 calculates a deviation δ from a target height (a height at which the tracking unit 12 should be positioned when leveled to the finished height H) of the tracking unit 12 on the basis of the finished height data. This deviation δ is transmitted to the tracking unit 12 by the tracking light P2 modulated by a modulation circuit (see FIG. 7) as modulation means. This will be described in detail later.

Figure 6:
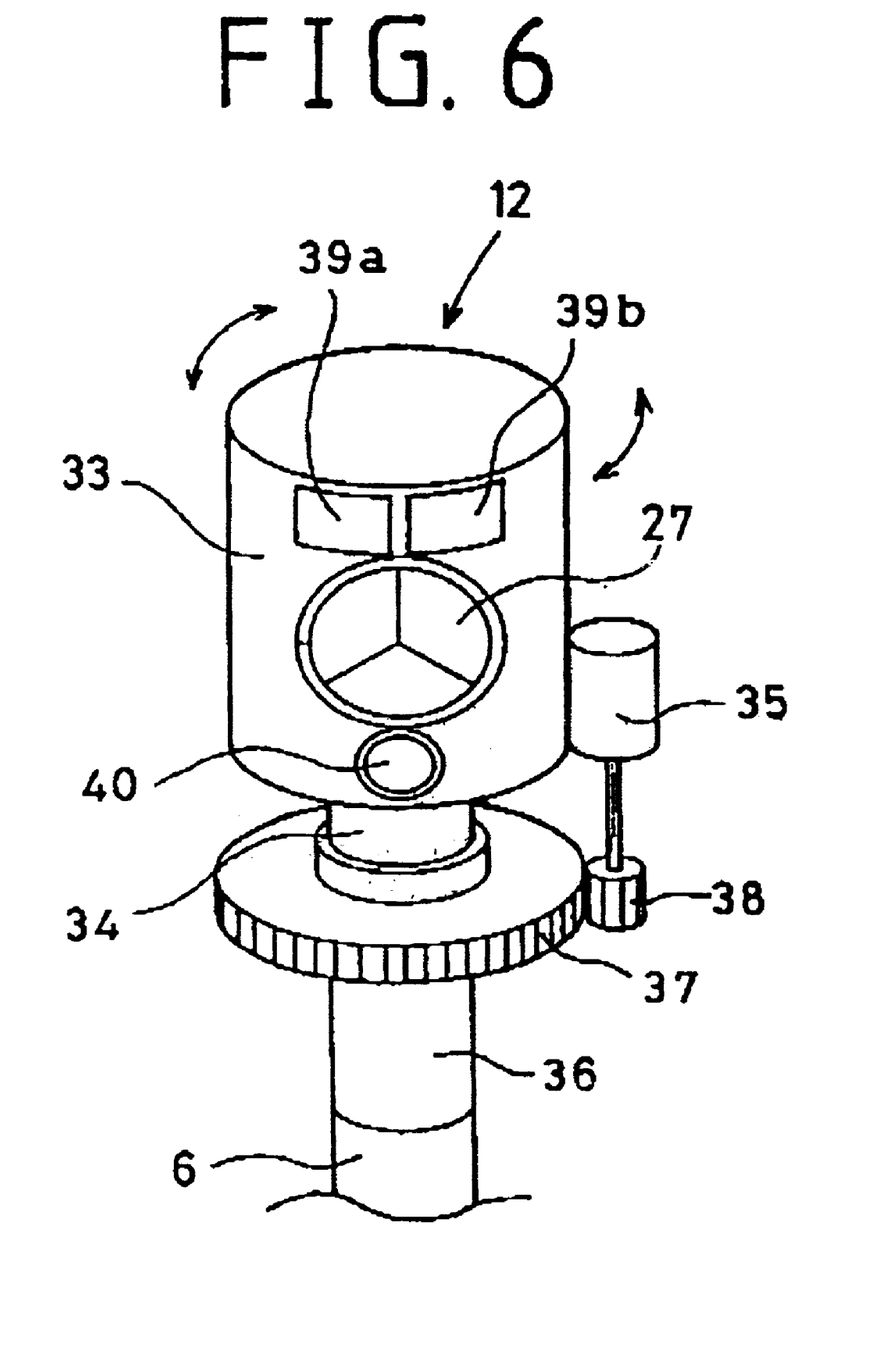
FIG. 6 is an explanatory view showing a schematic constitution of a tracking unit.

The tracking unit 12 is provided on the pole 6 stood upright on the blade 5 so that the former is positioned at a predetermined height on the blade 5. The tracking unit 12 comprises, as shown in FIG. 6, a substantially columnar tracking unit body 33, a shaft portion 34 extended downward from the bottom of the tracking unit body 33, and a driving motor 35 secured to the peripheral surface of the tracking unit body 33. A bearing 36 is provided above the pole 6, and the shaft portion 34 is rotatably supported on the baring 36. A gear 31 is integrally provided in the peripheral surface of the bearing 36. A gear 38 provided on an output shaft of the driving motor 35 is meshed with the gear 37, and the tracking unit 12 can be horizontally rotated on the pole 6 by the driving of the driving motor 35.

Embedded in the peripheral surface of the tracking unit body 33 are the prism 27, a pair of light receiving elements 39a, 39b, and a light emitting device 40 as light emitting means. The pair of light receiving element 39a and 39b are arranged to left and right along with the rotational direction of the tracking unit 12, and the prism 27 and the light emitting device 40 are arranged vertically at a position away by equal distance from the light receiving element 39a and the light receiving element 39b. The light receiving elements 39a, 39b, the prism 27, and the light emitting device 40 are close to each other on the peripheral surface of the tracking unit body 33.

A driving control circuit, not shown, is connected to the light receiving elements 39a, 39b. The driving control circuit drives, when the amount of light received by either light receiving element is large and its light receiving output is large, the driving motor 35 to rotate the tracking unit 12 so that the light receiving outputs of both the light receiving elements become equal to each other. That is, for example, when the light receiving output of the light receiving element 39a is larger than that of the light receiving element 39b, the tracking unit 12 rotates in the direction from the light receiving element 39b toward the light receiving element 39a so that the prism 27 is automatically directed. at the automatic tracking type survey unit 10. Thereby, the automatic tracking type survey unit 10 can track the tracking unit 12 even if the bulldozer 4 should change its direction to any direction by 360 degrees without provision of a plurality of high-expensive prisms on the peripheral surface of the tracking unit body 33.

Figure 9:
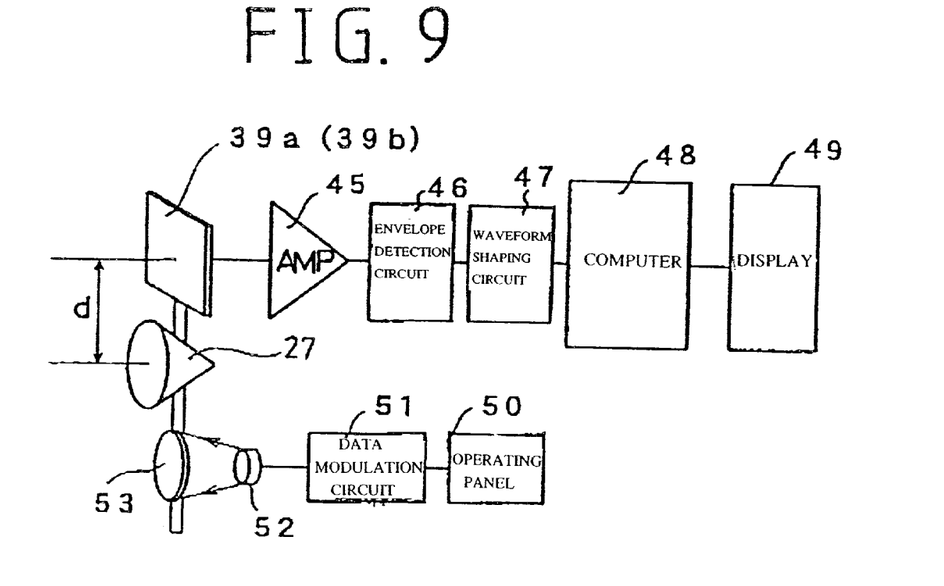
FIG. 9 is a block diagram showing an electric circuit for demodulation and a light emitting device for modulation in the tracking unit.

An electric circuit as demodulation means is connected to the light receiving elements 39a and 39b (see FIG. 9). This electric circuit demodulates the modulated tracking light P2 from the automatic tracking type survey unit 10, details of which will be described later.

Note that since the tracking unit 12 is horizontally rotatable, it can change its direction laterally, but cannot change its direction vertically. The direction of the tracking unit 12 cannot be changed vertically as described above because the prism and the light receiving element normally can respond to light incident from the direction of about ±30 degrees with respect to the normal direction of the light receiving surface; the automatic tracking type survey unit 10 and the tracking unit 12 are normally positioned relatively within the range of the angle for use; and if the measured light P1 of the EDM portion 22 is made to have a suitable diversion, the measurement is possible Further, in the case where bilateral communication as described later is carried out between the automatic tracking type survey unit 10 and the tracking unit 12, if the tracking unit 12 is normally opposed to the automatic tracking type survey unit 10 as possible, a divergent angle of light from the light receiving device 40 can be narrowed to enable communication over a long distance. However, even in this case, a control device for changing the direction to a vertical direction is not newly provided on the tracking unit 12, but if a plurality of light emitting elements are provided and light emitting surfaces of respective light emitting elements are directed in vertically different directions, the constitution will be easy.

The working procedure will be summarized and explained hereinafter.

The automatic tracking type survey unit 10 is installed on the known point O at a visible place of the working site and set as a reference position. A horizontal coordinate position of the known point O, a machine height of the automatic tracking type survey unit 10, and a height from the edge 5a of the blade 5 to the center position 27a of the prism 27 are input into the personal computer 11, and the surveying machine 10 is directed toward the prism 27 to operate the work.

The automatic tracking type survey unit 10 automatically tracks the prism 27, and the distance to the prism 27 is measured by the EDM portion 22. The horizontal coordinate positions X, Y of the prism 27 are determined from the measured data and the angle data by the rotary encoder not shown, and the automatic tracking type survey unit 10 outputs them to the personal computer 11.

The personal computer 11 obtains a target height Z of the tracking unit 12 in the horizontal coordinate positions X, Y on the basis of the finished height data. The personal computer 11 issues the automatic tracking type survey unit 10 instructions so that the automatic tracking type survey unit 10 may collimate points of the coordinates (X, Y and Z), and the vertical rotational means 20 rotates the lens barrel portion 19 in accordance with the instructions.

Upon termination of rotation of the lens barrel portion 19, the automatic tracking type survey unit 10 calculates the deviation δ from the target height of the tracking unit 12. In the automatic tracking type survey unit 10, the tracking light P2 is demodulated by the modulation circuit for transmitting the deviation δ as information relating to the surveying work toward the tracking unit 12. Note that the deviation δ is output from the automatic tracking type survey unit 10 to the personal computer 11, and is recorded in a memory not shown as execution evaluation data.

Figure 7:
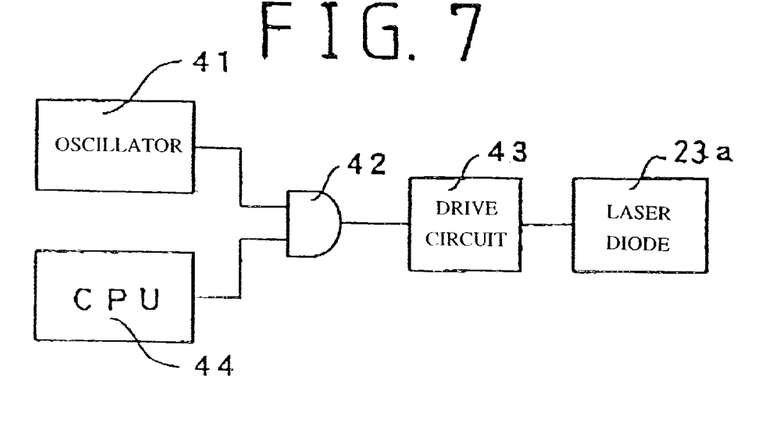
FIG. 7 is a block diagram showing a modulation circuit of the survey unit.

The modulation circuit of the automatic tracking type survey unit 10 comprises an oscillator 41, a gate circuit 42, a drive circuit 43, and a CPU 44, as shown in FIG. 7. The oscillator 41 outputs a carrier wave; the gate circuit 42 demodulates serial data relating to the deviation δ from the CPU 44; the drive circuit 43 causes the laser diode 23a to emit light while being based on the serial data; and the modulated tracking light P2 is delivered to the light receiving elements 39a, 39b accompanied with information of the deviation δ.

According to the optical communication by way of modulation of the tracking light as described, the survey unit is able to transmit information toward the tracking target while avoiding radio interference or communication trouble even under the presence of electric wave noises.

The data transmission in the automatic tracking type survey unit 10 is carried out with the tracking light P2 redirected at the tracking unit 12 after completion of full scanning. In this embodiment, since the light receiving elements 39a, 39b are arranged above the prism 27, it is desirable that for carrying out the transmission with accuracy, the tracking light P2 is not directed at the center position 27a of the prism 27 but directed at the light receiving elements 39a, 39b somewhat thereabove. How much the tracking light P2 is deflected upwardly from the center position 27a can be easily computed since an offset d (see FIG. 9) in a height direction between the prism 27 and the light receiving elements 39a, 39b is known, and the distance from the known point O to the prism 27 has been already measured by the automatic tracking type survey unit 10.

While in the present embodiment, the automatic tracking type survey unit 10 tracks the tracking unit 12 also in a high-low direction (a vertical direction), it is to be noted that the automatic tracking type survey unit 10 cannot track in the aforesaid direction but can track only the movement in the horizontal direction of the tracking unit 12. In such a case as described, the positions of the prism 27 of the tracking unit 12 and the light receiving elements 39a, 39b are not always the same as a collimation axis of the automatic tracking type survey unit 10, but at the time when the raster scanning is carried out for tracking, how the prism 27 is deviated with respect to the collimation axis can be judged, and therefore, the modulated tracking light P2 can be deflected according to the deviation for communication.

Figure 8:
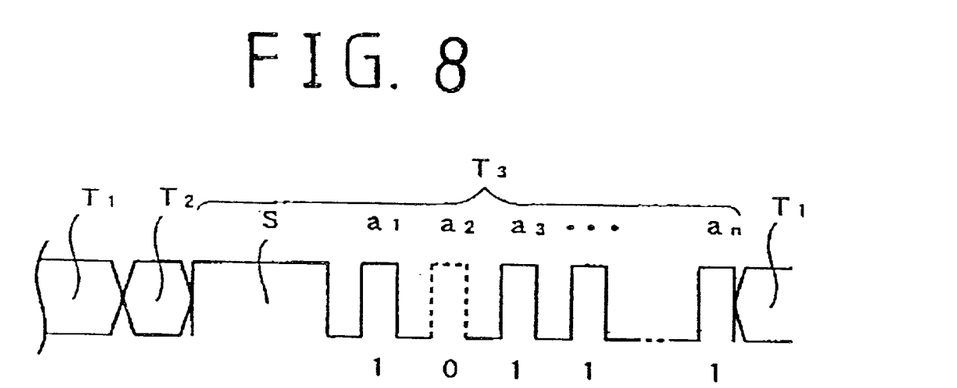
FIG. 8 is an explanatory view showing one example of the tracking light modulated in the survey unit.

FIG. 8 shows the tracking light P2 modulated by an ASK system, as one example of modulation of the aforementioned modulation circuit. In FIG. 8, reference numeral T1 designates a period during which raster scanning is carried out for tracking to detect a position of the prism 27; T2 designates a period during which the tracking light P2 is deflected toward the light receiving elements 39a, 39b; and T3 designates a period during which data communication is carried out from the automatic tracking type survey unit 10 toward the tracking unit 12.

In the period T3, S indicates a synchronous pattern representative of a start of a data block, and a1, a2, a3, ... indicate output levels of the tracking light P2 output in bit serial (hereinafter referred to as "bit-corresponding outputs"). A train of continuous pulse signals whose duty ratio is 50% are constituted by the bit-corresponding outputs a1, a2, a3, .... The synchronous pattern S has the time width larger several times or more than the width of the period during which the bit-corresponding outputs a1, a2, a3, ... occur so that it is detected with ease. Here, the time width of the synchronous pattern S is 1 msec, the time width of each of the bit-corresponding outputs a1, a2, a3, ... is 0.1 msec, the width of the predetermined time for dividing the bit-corresponding outputs is 0.1 msec, and the time it takes for data communication of 10 bits is 3 msec. On the other hand, since approximately 10 msec is necessary for the raster scanning for tracking as mentioned above, the time for data communication poses no problem with respect to the tracking.

The modulated tracking light P2 from the automatic tracking type survey unit 10 is received by the light receiving elements 39a, 39b, and after this, is processed in the electric circuit shown in FIG. 9. More specifically, received signals of the light receiving elements 39a, 39b are amplified to a suitable level by an amplifier 45, a carrier wave thereof being removed by an envelope detection circuit 46, shaped by a wave shaping circuit 47 and after this input into a computer 48, The computer 48 detects the synchronous pattern S for which "1" continues for a given period of time or more, and judges whether signals input every given period are "0" or "1" from the rising-down timing of the synchronous pattern S detected to thereby demodulate data. The computer 48 outputs the demodulated data to a display 49 or an output connector not shown.

Note that the tracking light P2 during raster scanning is also incident on the light receiving elements 39a, 39b, but since this is not incident continuously as compared with the synchronous pattern S, it comprises no dominant cause of impeding the detection of the synchronous pattern S. Further, the measured light P1 is also incident on the light receiving elements 39a, 39b. However, if carrier-wave frequency for transmission of data is differentiated from modulation frequency (normally, 15 MHz and 75 kHz are used) of the EDM portion 22 and a filter circuit is provided to discriminate frequencies from each other, the measured light P1 can be discriminated from the modulated tracking light P2. Therefore, it also comprises no dominant cause of impeding the detection of the synchronous pattern S.

The bulldozer 4 activates the hydraulic controller 9 on the basis of data of the deviation δ received by the tracking unit 12 to adjust a height position of the blade 5 so that the tracking unit 12 is made closer to a target height. The ground is leveled by the blade S of which height position is adjusted whereby the ground of the working site is gradually excavated closer to a finished height, finally forming a finished plane H.

On the other hand, the light emitting device 40 of the tracking unit 12 sends modulation light toward the automatic tracking type survey unit 10 on the basis of the operating conditions of the bulldozer 4. In this embodiment, the automatic tracking type survey unit 10 has various operating modes, which can be switched to an adequate operating mode according to the operating conditions of the bulldozer 4 by the light emission of the light emitting device 40.

The light emitting device 40 schematically comprises an operating panel 50 including a switch for switching operating modes of the automatic tracking type survey unit 10 and the like, a data modulation circuit 51, a light emitting element 52 such as LED, and a lens 53 having a suitable divergent angle. With the operating panel 50, the operating mode is selected or switched automatically or manually on the basis of the operating conditions of the bulldozer 4, an operating mode switching signal from the operating panel 50 is modulated in data by the data modulation circuit 51, the light emitting element 52 emits modulation light according to the output of the data modulation circuit 51, and the modulation light is diverged to the lens 53 and sent toward the automatic tracking type survey unit 10. For example, ASK system may be adopted for the modulation system in the data modulation circuit 51, but the modulation by way of the ASK system has been already described, explanation of which is therefore omitted herein.

The modulation light from the light emitting device 40 is received by the light emitting element 30 for receiving the tracking reflection light P2 in the automatic tracking type survey unit 10. An operating mode control circuit, not shown, is connected to the light receiving element 30. The operating mode control circuit plays apart as modulation light demodulating means for demodulating modulation light received. The operating mode control circuit sends a control signal on the basis of the result of demodulation, and the operating mode of the automatic tracking type survey unit 10 is switched in response to the control signal.

Figure 10:
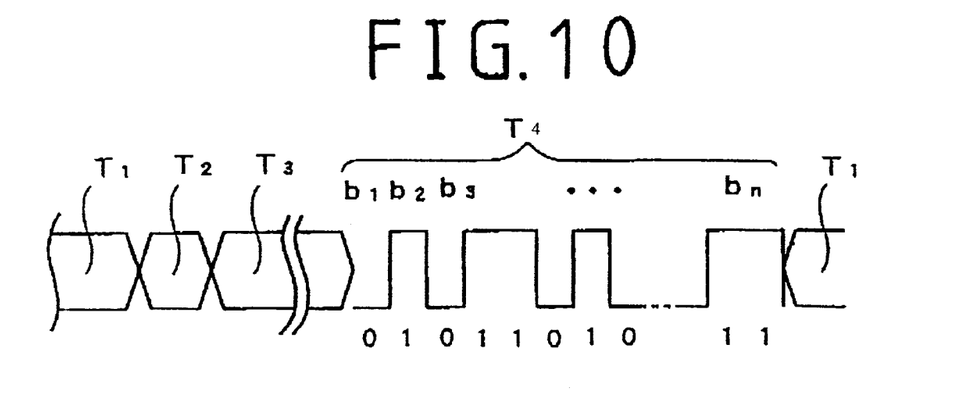
FIG. 10 is an explanatory view showing one example of modulated light modulated in the tracking unit.

FIG. 10 shows the light emitting timing of the light emitting device 40. Since the light receiving element 30 for tracking is jointly used for reception of data in the automatic tracking type survey unit 10, when an attempt is made to receive data during the tracking operation (during a period for detecting a position of a prism), modulation light from the light emitting device 40 and tracking reflection light P2 from the prism 27 are sometimes superposed on each other to make it possible to detect a position of the tracking unit 12. Also, while the automatic tracking type survey unit 10 is transmitting data toward the tracking unit 12, the modulated tracking light P2 is irradiated on not only the light receiving elements 39a, 39b but also the prism 27 and returns as the reflected light to the automatic tracking type survey unit 10, and therefore, even if the light emitting device 40 is emitted during this period, the light receiving element 30 is to simultaneously receive two different modulation light, failing to adequately control the operation of the automatic tracking type survey unit 10. Accordingly, it is necessary to carry out the light emission of the light emitting device 40 after completion of data transmission, that is, during a period T4 except during a period T1 when raster scanning for tracking is carried out and a position of the prism 27 is detected, during a period T2 when the tracking light P2 is deflected toward the light receiving elements 39a, 39b, and during a period T3 when data communication is carried out toward the tracking unit 12 from the automatic tracking type survey unit 10.

The modulation of the light emission of the light emitting device 40 is in accordance with the ASK system, In the period T4, reference numerals b1, b2, b3, . . . indicate output levels of modulation light output in bit serial (hereinafter referred to as "bit-corresponding output"). A train of continuous pulse signals of which duty ratio changes are constituted by the bit-corresponding outputs b1, b2, b3, . . . Since in the period T4, synchronization has been already taken by the synchronous pattern S in the period T3, it is not necessary to secure the synchronous pattern, and therefore, even if the condition in which the bit-corresponding outputs b1, b2, . . . are continuously "1" continues, no confusion with the synchronous pattern possibly occurs. Therefore, the tracking unit 12 may, after detecting the synchronous pattern S and receiving data on the deviation δ, begin to deliver data for controlling operating mode of the automatic tracking type survey unit 10 after a lapse of a predetermined time. On the other hand, after sending data on the deviation δ, the automatic tracking type survey unit 10 begins to receive data from the tracking unit 12 after a lapse of a predetermined time. The received data of the automatic tracking type survey unit 10 is demodulated by the processing similar to that shown in FIG. 10 in the operating mode control circuit.

While in the aforementioned embodiment, the automatic tracking type survey unit 10 scans the tracking light P2 to thereby track the tracking unit 12, it is to be noted that the present invention is not limited thereto, but, for example, a survey unit can be constituted by using a 2-dimensional CCD sensor and a 4-split light receiving element for the light receiving means. In this case, the generating portion 23 is replaced with a light source portion for radiating tracking light having a suitable divergent angle, and a scanning mechanism is not required.

According to the constitution as described above, the tracking light P2 radiated from the light source portion passes through the objective lens 24 to illuminate the prism 27 within the range of irradiation, and the tracking reflected light P2 from the prism 7 again passes through the objective lens 24 and is formed in the light receiving means. A position of an image on the light receiving means is detected and fed back to a servo system whereby the automatic tracking is carried out.

Figure 11:
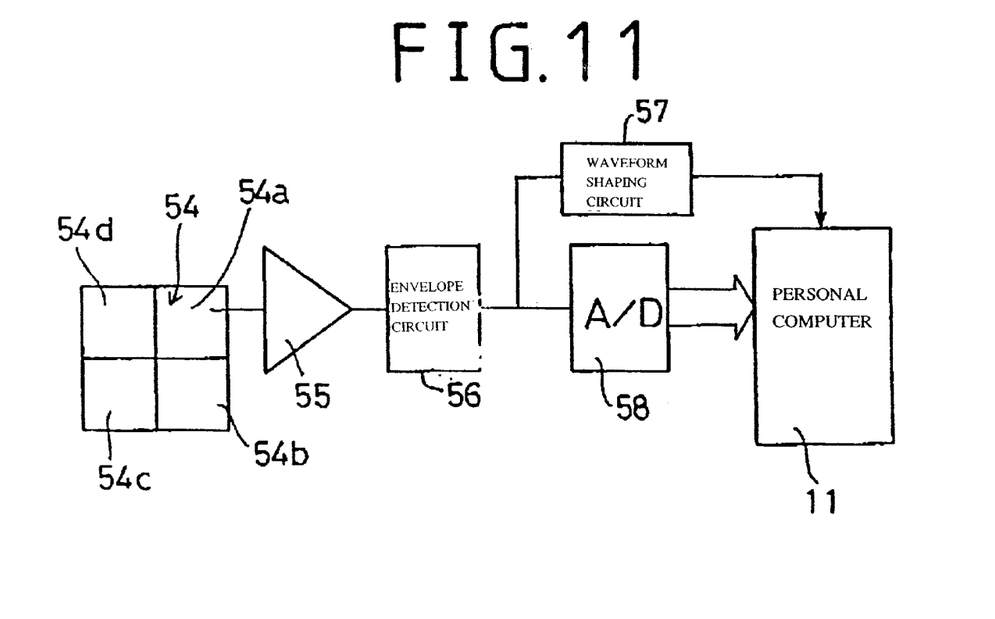
FIG. 11 is a block diagram showing one example of the detection of a light receiving position using a 4-split light receiving element.

FIG. 11 shows an example which uses a 4-split light receiving element as light receiving means. This 4-split light receiving element 54 comprises four light receiving surfaces 54a to 54d and is arranged within the measuring and tracking unit portion 21 so that the center thereof coincides with an optical axis. The tracking reflected light P2 from the prism 27 formed in the light receiving surfaces 54a to 54d generates an output in proportional to au area on which it impinges the light receiving surfaces 54a to 54d. A light receiving position on the 4-split light receiving element 54 and a position of the prism 27 are detected on the base of the output of the four light receiving surfaces 54a to 54d.

In the case where the 4-split light receiving element is used as described above, since the tracking light P2 is always irradiated on the prism 27 of the tracking unit 12 and the light receiving elements 39a, 39b, it is not necessary to time-share the tracking and the communication from the automatic tracking type survey unit 10. In this case, since the modulated tracking light P2 is reflected by the prism 27 and returned to the automatic tracking type survey unit 10, the synchronous pattern S which emits light stably not depending on data is detected, and a light receiving position of the tracking reflected light P2 in the 4-split light receiving element 54 is detected on the basis of a signal level of the synchronous pattern S.

An output of the light receiving surface 54a of the 4-split light receiving element 54 is amplified to a suitable level by an amplifier 56, a carrier wave thereof being removed by an envelope detection circuit 56, is shaped by a waveform shaping circuit 57, and after this is sent to the personal computer 11. The personal computer 11 detects the synchronous pattern S in which "1" continues for a predetermined time or more, and an output of an A/D converter 58 at that time is taken in. Outputs of other light receiving surfaces 54b to 54d are likewise processed. A light receiving position on the 4-split light receiving element 54 of the tracking reflected light P2 is arithmetically calculated by the personal computer 11 from the A/D conversion output value with respect to the light receiving surfaces 54a to 54d, and the calculated result is fed back to the rotational mechanisms 17 and 20 of the servo system. However, when the modulation light from the light emitting device 40 is received by the 4-split light receiving element 54, it is necessary to provide the time-division between communication from the automatic tracking type survey unit 10 toward the tracking unit 12 and communication from the tracking unit 12 toward the automatic tracking type survey unit 10 in order to avoid the interference between the modulation light and the tracking reflected light P2.

If a 2-dimensional CCD sensor or a 4-split light receiving element is used as light receiving means, the tracking light is not emitted from the automatic tracking type survey unit 10 to receive none, but it is also possible that a tracking light source is installed in the vicinity of the prism 27 of the tracking unit 12, and an image of the tracking light source is received by the light receiving means to track a tracking target. Further, since a beam scanning mechanism is not required, the constitution of the automatic tracking type survey unit 10 can be simplified, but tracking light having a divergence to some extent is necessary in order to positively irradiate the prism 27 or the automatic tracking type survey unit 10, and a distance capable of being tracked is limited.

Although the invention has been described in its preferred form with a certain degree of particularity, obviously many changes and variations are possible therein. It is therefore to be understood that the present invention may be practiced otherwise than as specifically described herein without departing from the scope and spirit thereof. For example, as a modulation and demodulation system, other known systems (such as a PSK system) other than ASK modulation and demodulation can be utilized.

What is claimed is:

1. A communication system for a surveying instrument, comprising:

a tracking target for reflecting tracking light therefrom;

a survey unit for emitting said tracking light toward said tracking target and receiving said tracking light reflected from said tracking target using light receiving means to thereby automatically track said tracking target;

modulation means for modulating said tracking light in order to transmit information concerning a survey work toward said tracking target;

a light receiving element provided on said tracking target to receive said tracking light; and demodulation means for demodulating said tracking light received by said light receiving element, wherein said tracking target has light emitting means for sending modulation light including information concerning a survey work toward said light receiving means.

2. The communication system of claim 1, wherein said tracking light is a scanning beam.

3. The communication system of claim 1, wherein:

said survey unit is installed at a known point, respective points of a working site are designated as coordinates with said known point defined as a reference, said tracking target is provided on a ground leveling implement of a construction machine, said construction machine has ground leveling implement control means for controlling said ground leveling implement so that said working site is leveled by said ground leveling implement to form a finished plane;

on a side of said survey unit, there are provided finished height data memory means for storing a height from said known point at each horizontal coordinate position of said finished plane as finished height data, horizontal coordinate position determination means for determining a horizontal coordinate position of said tracking target, and arithmetic means for calculating a deviation from a target height of said tracking target at said horizontal coordinate position on the basis of the finished height data with respect to a determined horizontal coordinate position;

said deviation is transmitted as information concerning a surveying work toward said tracking target, and said ground leveling implement control means adjusts a height position of said ground leveling implement so that said tracking target comes closer to said target height on the basis of a received result of said tracking target whereby a ground at said determined horizontal coordinate position is leveled into said finished plane.

4. The communication system of claim 1, wherein:

said survey unit is installed at a known point, respective points of a working site are designated as coordinates with said known point defined as a reference, said tracking target is provided on a ground leveling implement of a construction machine, said construction machine has ground leveling implement control means for controlling said ground leveling implement so that said working site is leveled by said ground leveling implement to form a finished plane;

on a side of said survey unit, there are provided finished-height data memory means for storing a height from said known point at each horizontal coordinate position of said finished plane as finished height data, horizontal coordinate position determination means for determining a horizontal coordinate position of said tracking target, and arithmetic means for calculating a deviation from a target height of said tracking target at said horizontal coordinate position on the basis of the fished height data with respect to a determined horizontal coordinate position;

said tracking light comprises a scanning beam, said deviation is transmitted as information concerning a surveying work toward said tracking target, and said ground leveling implement control means adjusts a height position of said ground leveling implement so that said tracking target comes closer to said target height on the basis of a received result of said tracking target whereby a ground at said determined horizontal coordinate position is leveled into said finished plane.

5. The communication system of claim 1, wherein said tracking target is horizontally rotatable together with said light receiving element, and is automatically directed toward said survey unit on the basis of a received-light output of said light receiving element.

6. The communication system of claim 5, wherein said survey unit is installed at a known point, respective points of a working site are grasped by coordinates with said known point regarded as a reference, said tracking target is provided on a ground leveling implement of a construction machine, said construction machine has ground leveling implement control means for controlling said ground leveling implement so that said working site is leveled by said ground leveling implement to form a finished plane;

on a side of said survey unit, there are provided finished-height data memory means for storing a height from said known point at each horizontal coordinate position of said finished plane as finished height data, horizontal coordinate position determination means for determining a horizontal coordinate position of said tracking target, and arithmetic means for calculating a deviation from a target height of said tracking target at said horizontal coordinate position on the basis of the finished height data with respect to a determined horizontal coordinate position;

said deviation is transmitted as information concerning a surveying work toward said tracking target, and said ground leveling implement control means adjusts a height position of said ground leveling implement so that said tracking target comes closer to said target height on the basis of a received result of said tracking target whereby a ground at said determined horizontal coordinate position is leveled into said finished plane.

7. The communication system of claim 1, wherein:

said survey unit is installed at a known point, respective points of a working site are grasped by coordinates with said known point regarded as a reference, said tracking target is provided on a ground leveling implement of a construction machine, said construction machine has ground leveling implement control means for controlling said ground leveling implement so that said working site is leveled by said ground leveling implement to form a finished plane;

on a side of said survey unit, there are provided finished-height data memory means for storing a height from said known point at each horizontal coordinate position of said finished plane as finished height data, horizontal coordinate position determination means for determining a horizontal coordinate position of said tracking target, and arithmetic means for calculating a deviation from a target height of said tracking target at said horizontal coordinate position on the basis of the finished height data with respect to a determined horizontal coordinate position;

said deviation is transmitted as information concerning a surveying work toward said tracking target, and said ground leveling implement control means adjusts a height position of said ground leveling implement so that said tracking target comes closer to said target height on the basis of a received result of said tracking target whereby a ground at said determined horizontal coordinate position is leveled into said finished plane.

8. The communication system of claim 1, wherein said tracking target is horizontally rotatable together with said light receiving element, and is automatically directed toward said survey unit on the basis of a received-light output of said light receiving element.

9. A communication system for a surveying machine comprising:

a tracking target for reflecting tracking light therefrom;

a survey unit for irradiating said tracking light toward said tracking target and receiving said tracking light reflected from said tracking target using light receiving means to thereby automatically track said tracking target, and light emitting means provided on said tracking target to send modulation light including information concerning a surveying work toward said survey unit.

10. The communication system of claim 9, wherein said tracking light is a scanning beam.

11. The communication system of claim 9, wherein said tracking target is provided on a construction machine, and said information concerning the surveying work is information to control operation of said survey unit on the basis of operating conditions of said construction machine.

12. The communication system of claim 9, wherein said tracking light is a scanning beam, said tracking target is provided on a construction machine, and said information concerning the surveying work is information for controlling operation of said survey unit on the basis of operating conditions of said construction machine.

13. The communication system of claim 9, wherein said modulation light is received by said light receiving means, and said survey unit has modulation light demodulating means for demodulating said modulation light.

14. The communication system of claim 13, wherein said tracking target is provided on a construction machine, and said information concerning the surveying work is information for controlling operation of said survey unit on the basis of operating conditions of said construction machine.

* * * * *